(12) United States Patent
Miller et al.

(10) Patent No.: US 8,775,020 B2
(45) Date of Patent: Jul. 8, 2014

(54) SYSTEM AND METHOD FOR TRANSMITTING VEHICLE INFORMATION TO AN OCCUPANT COMMUNICATION DEVICE

(75) Inventors: Thomas Lee Miller, Ann Arbor, MI (US); Brian Bennie, Sterling Heights, MI (US); David Anthony Hatton, Berkley, MI (US); Douglas Paul Walser, Rochester, MI (US); Derrick E. Cook, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 13/384,422

(22) PCT Filed: May 7, 2010

(86) PCT No.: PCT/US2010/034030
§ 371 (c)(1),
(2), (4) Date: Jan. 17, 2012

(87) PCT Pub. No.: WO2011/016886
PCT Pub. Date: Feb. 10, 2011

(65) Prior Publication Data
US 2012/0119936 A1 May 17, 2012

Related U.S. Application Data

(60) Provisional application No. 61/231,625, filed on Aug. 5, 2009.

(51) Int. Cl.
*G01S 19/13* (2010.01)
(52) U.S. Cl.
USPC .............................. 701/36; 701/2; 455/569.2

(58) Field of Classification Search
USPC ............. 701/36, 2; 455/569.2, 441, 565, 411; 340/425.5, 540, 5.23, 5.72
See application file for complete search history.

(56) References Cited

U.S. PATENT DOCUMENTS

| | | | |
|---|---|---|---|
| 5,769,051 | A | 6/1998 | Bayron et al. |
| 5,803,043 | A | 9/1998 | Bayron et al. |
| 6,028,537 | A | 2/2000 | Suman et al. |

(Continued)

FOREIGN PATENT DOCUMENTS

| | | |
|---|---|---|
| DE | 19961619 A1 | 6/2001 |
| GB | 2273580 A | 6/1994 |

OTHER PUBLICATIONS

International Preliminary Report for corresponding Application No. PCT/US10/34030, mailed May 13, 2013, 6 pages.
English translation of DE 199 61 619 A1, Jun. 28, 2001, 5 pages.

(Continued)

*Primary Examiner* — Tan Q Nguyen
(74) *Attorney, Agent, or Firm* — Brooks Kushman P.C.; Jennifer M. Stec

(57) ABSTRACT

In at least one embodiment, an apparatus for transmitting vehicle information to an occupant communication device (OCD) is provided. The system comprises a communication module positioned within the vehicle. The communication device is configured to receive a transmission status signal indicative of a transmission mode for the vehicle. The communication device is further configured to transmit the transmission status signal over a wireless protocol to the OCD such that the OCD is disabled from being controlled by switches positioned thereon if the transmission mode enables movement of the vehicle.

15 Claims, 7 Drawing Sheets

(56) References Cited

U.S. PATENT DOCUMENTS

| | | | |
|---|---|---|---|
| 6,198,996 B1* | 3/2001 | Berstis | 701/36 |
| 6,271,745 B1 | 8/2001 | Anzai et al. | |
| 6,353,778 B1 | 3/2002 | Brown | |
| 6,386,007 B1 | 5/2002 | Johnson et al. | |
| 6,411,899 B2 | 6/2002 | Dussell et al. | |
| 6,430,488 B1 | 8/2002 | Goldman et al. | |
| 6,518,882 B2 | 2/2003 | Johnson et al. | |
| 6,675,082 B2 | 1/2004 | Galli et al. | |
| 6,690,956 B2 | 2/2004 | Chua et al. | |
| 6,741,920 B1* | 5/2004 | Otto | 701/49 |
| 6,772,061 B1 | 8/2004 | Berthiaume et al. | |
| 6,952,156 B2 | 10/2005 | Arshad et al. | |
| 6,998,956 B2 | 2/2006 | Dix | |
| 7,006,914 B1 | 2/2006 | Cahoon | |
| 7,075,409 B2 | 7/2006 | Guba | |
| 7,471,929 B2 | 12/2008 | Fujioka et al. | |
| 7,505,784 B2 | 3/2009 | Barbera | |
| 7,757,803 B2 | 7/2010 | Fiske et al. | |
| 7,957,773 B2 | 6/2011 | Chua et al. | |
| 7,959,177 B2 | 6/2011 | Fiske et al. | |
| 8,050,815 B2 | 11/2011 | Perry et al. | |
| 8,131,205 B2 | 3/2012 | Rosen | |
| 2002/0107032 A1 | 8/2002 | Agness et al. | |
| 2003/0134660 A1 | 7/2003 | Himmel et al. | |
| 2004/0198306 A1 | 10/2004 | Singh et al. | |
| 2004/0263316 A1 | 12/2004 | Dix et al. | |
| 2005/0019228 A1 | 1/2005 | Myers et al. | |
| 2005/0088284 A1 | 4/2005 | Zai et al. | |
| 2006/0114101 A1 | 6/2006 | Schambeck et al. | |
| 2007/0072616 A1 | 3/2007 | Irani | |
| 2007/0120948 A1 | 5/2007 | Fujioka et al. | |
| 2007/0124043 A1 | 5/2007 | Ayoub et al. | |
| 2009/0111422 A1 | 4/2009 | Bremer et al. | |
| 2009/0312901 A1 | 12/2009 | Miller et al. | |
| 2010/0035632 A1* | 2/2010 | Catten | 455/456.1 |
| 2010/0227629 A1 | 9/2010 | Cook et al. | |
| 2011/0021234 A1 | 1/2011 | Tibbitts et al. | |
| 2011/0039581 A1* | 2/2011 | Cai et al. | 455/456.4 |
| 2011/0077032 A1 | 3/2011 | Correale et al. | |
| 2011/0105082 A1 | 5/2011 | Haley | |
| 2011/0257973 A1 | 10/2011 | Chutorash et al. | |

OTHER PUBLICATIONS

Patty Mattern, "Getting smarter at getting safer", University of Minnesota, UMNnews, Sep. 13, 2005, 2 pages.
Ford Motor Company, "SYNC with Navigation System," Owner's Guide Supplement, SYNC System Version 1, Jul. 2007, 164 pages.
Ford Motor Company, "SYNC," Owner's Guide Supplement, SYNC System Version 1, Nov. 2007, 86 pages.
Ford Motor Company, "SYNC with Navigation System," Owner's Guide Supplement, SYNC System Version 2, Oct. 2008, 194 pages.
Ford Motor Company, "SYNC," Owner's Guide Supplement, SYNC System Version 2, Oct. 2008, 83 pages.
Ford Motor Company, "SYNC with Navigation System," Owner's Guide Supplement, SYNC System Version 3, Jul. 2009, 196 pages.
Ford Motor Company, "SYNC," Owner's Guide Supplement, SYNC System Version 3, Aug. 2009, 87 pages.
International Search Report and Written Opinion for corresponding PCT Application No. PCT/US2010/034030, mailed Jul. 9, 2010, 8 pages.
Chinese Office Action for corresponding Chinese Application No. 201080034499.8, mailed Sep. 17, 2013, 11 pages.

* cited by examiner

SYSTEM AND METHOD FOR TRANSMITTING VEHICLE INFORMATION TO AN OCCUPANT COMMUNICATION DEVICE

CROSS-REFERENCE TO RELATED APPLICATION

This application is the U.S. national phase of PCT Appln. No. PCT/US2010/034030, filed May 7, 2010, which claims the benefit of U.S. provisional application Ser. No. 61/231,625, filed Aug. 5, 2009, the disclosures of which are incorporated in their entirety by reference herein.

BACKGROUND

1. Technical Field

The embodiments described herein generally relate to, among other things, a system and method for transmitting vehicle information to an occupant communication device (OCD) in a vehicle.

2. Background Art

The use of portable communication devices in a vehicle has become widespread. Such devices may be used while the vehicle is being driven. Often times, the driver may be distracted and take his/her eyes off the road while trying to control the communication device. This condition may increase the risk of driving accidents.

SUMMARY

In at least one embodiment, an apparatus for transmitting vehicle information to an occupant communication device (OCD) is provided. The system comprises a communication module positioned within the vehicle. The communication device is configured to receive a transmission status signal indicative of a transmission mode for the vehicle. The communication device is further configured to transmit the transmission status signal over a wireless protocol to the OCD such that the OCD is disabled from being controlled by switches positioned thereon if the transmission mode enables movement of the vehicle.

DETAILED DESCRIPTION

Figure 1:
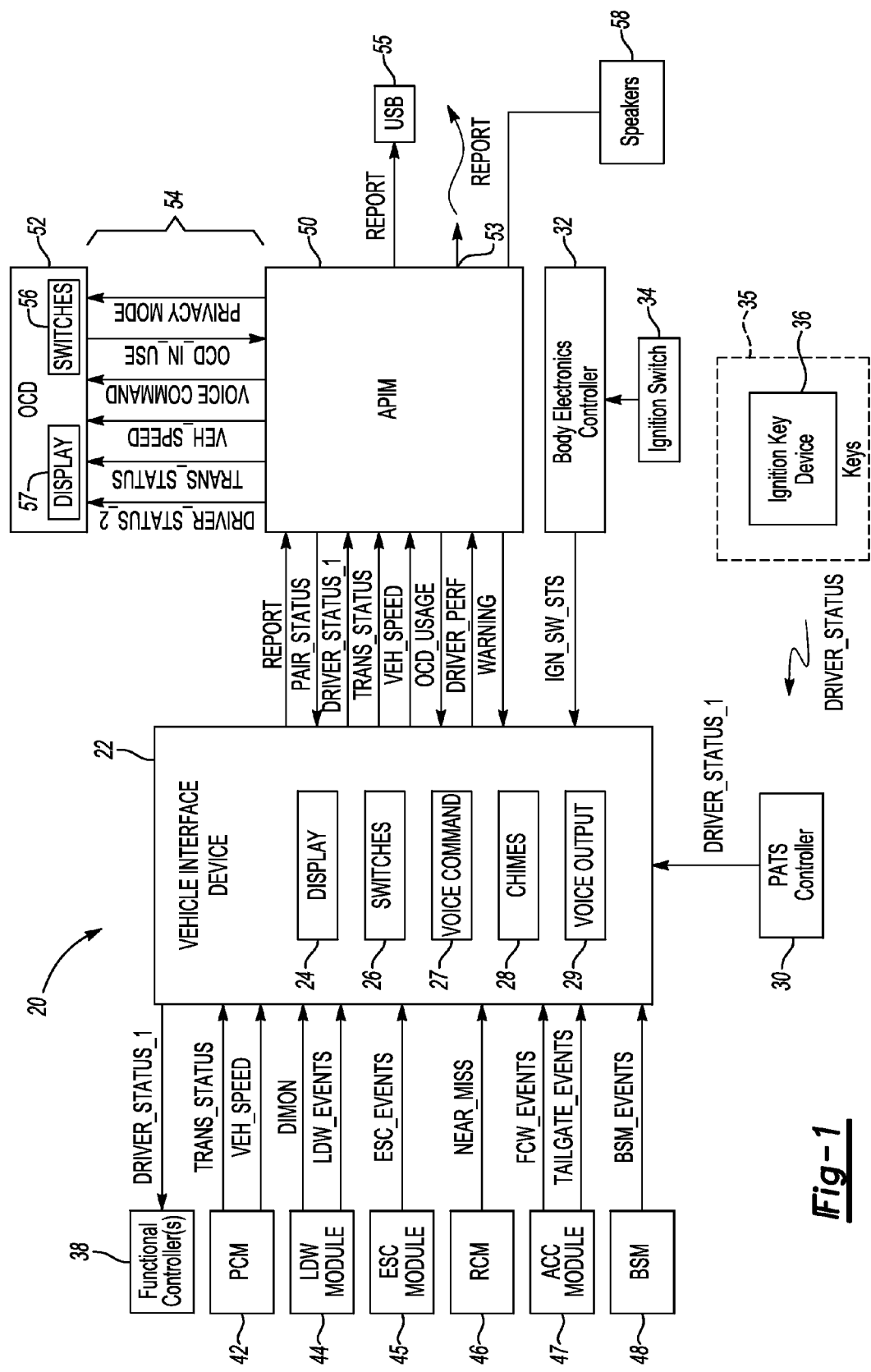
FIG. 1 depicts a system for transmitting vehicle information to the OCD in accordance to one embodiment of the present invention.

Various embodiments of the present invention may enable the transmission of vehicle data to an occupant communication device (such as a cell phone, text messaging device or other suitable device that enables user input (e.g., button selection or voice input)) to transmit data to another communication device. The OCD may use the vehicle information to control the manner in which data is input therein by a vehicle occupant.

Various embodiments of the present invention may identify the driver of the vehicle whereby primary and secondary drivers are determined and various levels of control are granted to the driver based on whether the driver is the primary driver or the secondary driver. In general, the primary driver (e.g., a parent, employer, consumer of valet services, or fleet vehicle owner) may be defined as the administrative driver who has greater control over the functionality of the various features (e.g., safety features and/or safety notification features) in the vehicle. For example, the primary driver may enable or disable the various features in the vehicle. The secondary driver may be defined as a restricted driver who has limited control in enabling and disabling features generally provided by the vehicle and is to abide by the functional restrictions imposed or selected by the vehicle or the primary driver. For example, the primary driver may enable the features for the secondary driver, and the secondary driver is not capable of disabling such features when enabled by the primary driver. In one example, the secondary driver may be permitted to use the OCD while driving, however the secondary driver may not be permitted to select buttons/switches positioned on the OCD to control the OCD. In this example, the secondary driver may use voice input to control the OCD.

It is contemplated that the embodiments set forth herein may be utilized for purposes other than those described and that challenges or problems noted herein are not intended to be an exhaustive list of problems that may be overcome by the embodiments of the present invention. Such challenges or problems are noted for illustrative purposes and that all of the challenges or problems that may be overcome by the various embodiments of the present invention are not described for purposes of brevity. Moreover, it is contemplated that the embodiments described herein may provide for a number of advantages (or benefits) and that those noted herein are not intended to be an exhaustive list that may be achieved. Such advantages disclosed herein are noted for illustrative purposes and that all of the advantages achieved by the embodiments of the present invention are not described for purposes of brevity as well. Furthermore, the examples provided herein are disclosed for illustrative purposes and are not intended to limit the scope in any manner.

The embodiments of the present invention as set forth in FIGS. 1-10 generally illustrate and describe a plurality of controllers (or modules/devices), or other electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired in the vehicle. It is generally recognized that each controller and/or module disclosed herein may include, but not limited to, any number of microprocessors, ICs, memory devices (e.g., FLASH, RAM, ROM, EPROM, EEPROM, or other suitable variants thereof), and software which co-act with one another to perform the various functions set forth below.

FIG. 1 depicts a system 20 for transmitting vehicle information to an occupant communication device (OCD) 52 in accordance to one embodiment of the present invention. The system 20 generally comprises a vehicle interface device 22, a passive anti-theft security (PATS) controller 30, a body electronics controller 32, and an auxiliary protocol interface module (APIM) 50. The device 22 includes a display 24 that provides information related to the various states of vehicle functionality to the driver. For example, the display 24 may provide, but not limited to, a driver identification message during vehicle startup, various administrative menu options, a seatbelt warning message, a speed limit start up message, a vehicle near top speed message, top speed message, driver identification speed warnings, an inhibit electronic stability control (ESC), a forward collision warning (FCW) message, a warning to pair the OCD 52 to the APIM 50 (this will be described in more detail below), and/or a warning to the driver that his/her driving performance has degraded while using the OCD 52. The display 24 may be implemented as a touch screen to enable a driver to make a selection therefrom.

The device 22 also includes a plurality of switches 26, a voice recognition command interface 27, chimes 28, and voice output capability 29. The driver may toggle the switches 26 to view different messages and/or select various options. The voice recognition command interface 27 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System", filed Dec. 31, 2003.

The chimes 28 may audibly notify the driver when predetermined vehicle conditions have been met. In one example, the device 22 may activate the chimes 28 when the vehicle is near a top speed, the vehicle has achieved a top speed, the vehicle has exceeded the top speed, there is a low level of fuel in the fuel tank, when the traction control is enabled, to notify the driver to pair the OCD 52 to the APIM 50, and/or to notify the driver that his/her driving performance has degraded while using the OCD 52. In one example, the voice output capability 29 enables the device 22 to transmit audio signals to the driver in the manner, but not limited to, that described in the '440 publication. While the display 24, the switches 26, the voice input command interface 27, chimes 28, and the voice output capability 29 are shown within the device 22, it is contemplated that one or more of these mechanisms may be positioned exterior to the device 22.

The device 22, the PATS controller 30, the body electronics controller 32, and the APIM 50 may communicate with one another via a data communication bus (or link). The communication bus may be implemented as a High/Medium Speed Controller Area Network (CAN) bus, a Local Interconnect Network (LIN), or other suitable data communication bus that is generally situated to facilitate data transfer therethrough. The particular type of bus used may vary based on the desired criteria of a particular implementation.

The body electronics controller 32 generally controls a portion or all of the electrical content in an interior section of the vehicle. In one example, the body electronics controller 32 may be a smart power distribution junction box (SPDJB) controller. The SPDJB controller may include a plurality of fuses, relays, and various micro-controllers for performing any number of functions related to the operation of interior and/or exterior electrically based functionality. These functions may include, but not limited to, electronic locking/unlocking (via interior door lock/unlock switches), remote keyless entry operation, vehicle lighting (interior and/or exterior), electronic power windows, and/or key ignition status (e.g., Off, Run, Start, and Accessory (ACCY)).

An ignition switch 34 may be operably coupled to the body electronics controller 32. The body electronics controller 32 may receive hardwired signals indicative of the position of the ignition switch 34 and transmit data messages on the data communication bus that are indicative of the position of the ignition switch. For example, the body electronics controller 32 may transmit a signal IGN_SW_STS (e.g., whether the ignition is in the OFF, Run, Start, or Accessory (ACCY) positions) over the data communication bus to the device 22. The signal IGN_SW_STS corresponds to the position of the ignition switch (e.g., Off, Run, Start, or Accessory positions).

The ignition switch 34 may receive keys 35 to start the vehicle. Each key 35 includes an ignition key device 36 embedded therein for communicating with the vehicle. The ignition key device 36 may be in the form of a transponder that includes an integrated circuit and an antenna. The transponder is adapted to transmit an electronic code via an RF signal as a signal DRIVER_STATUS to a receiver (not shown) in the PATS controller 30. The signal DRIVER_STATUS may be indicative of which driver (e.g., primary or secondary) is driving the vehicle. The signal DRIVER_STATUS may be in the form of a radio frequency (RF) based signal or a radio frequency identification (RFID) tag that corresponds to binary data. The PATS controller 30 determines if the RF based data in the signal DRIVER_STATUS matches predetermined data stored therein (e.g., in a look up table of the PATS controller 30) prior to allowing the vehicle to start for anti-theft purposes. In the event the RF based data matches the predetermined data, a powertrain control module (PCM) 42 (or engine controller) operably coupled to the PATS controller 30 enables an engine (not shown) to start. In general, the vehicle assembly plant, supplier facility (e.g., manufacturer of the keys and/or PATS controller 30), car dealership, or vehicle owner performs the operation of learning the data transmitted by the keys 35. The PATS controller 30 may also use the data on the signal DRIVER_STATUS for purposes of identifying whether the driver of the vehicle is the primary driver or the secondary driver.

The PATS controller 30 may transmit a signal DRIVER_STATUS_1 to the device 22 to indicate whether the driver is the primary driver or the secondary driver. Prior to the PATS controller 30 transmitting the signal DRIVER_STATUS_1, the keys 35 need to be programmed as a primary key or as a secondary key. The manner in which the keys 35 are designated as either a primary key or a secondary key is set forth in the following U.S. patent Ser. No. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; and Ser. No. 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; which are hereby incorporated by reference in their entirety.

The PATS controller 30 and/or the vehicle interface device 22 may transmit the signal DRIVER_STATUS_1 to functional controller(s) 38 (e.g., controller or module in the electrical system) such that the functionality or operation performed by a particular controller (or module) may be controlled based on the driver status (e.g., primary driver or secondary driver). For example, seat belt minder, fuel level indicator, reverse park aid, object detection, and traction control as found in U.S. patent Ser. No. 12/026,582, entitled "SYSTEM AND METHOD FOR CONTROLLING A SAFETY RESTRAINT STATUS BASED ON DRIVER STATUS" and filed on Feb. 6, 2008; Ser. No. 12/026,857, entitled "SYSTEM AND METHOD FOR CONTROLLING EARLY LOW FUEL WARNING BASED ON DRIVER STATUS" and filed on Feb. 6, 2008; Ser. No. 12/026,867, entitled "SYSTEM AND METHOD FOR CONTROLLING ELECTRONIC STABILITY CONTROL BASED ON DRIVER STATUS" and filed on Feb. 6, 2008; and Ser. No. 12/026,872, entitled "SYSTEM AND METHOD FOR CONTROLLING OBJECT DETECTION BASED ON DRIVER STATUS" and filed on Feb. 6, 2008, all of which are hereby incorporated by reference in their entirety, and are illustrative of the types of functionality or operations that may be controlled based on the driver status of the vehicle.

An additional example may include the primary driver turning on a hands-free operation for the secondary driver. In this case, the primary driver may enable the hands-free operation such that the secondary driver is precluded from inputting data via the switches 26 on the OCD 52 when the vehicle is moving. In this instance, the secondary driver is forced to control or generate the OCD 52 by voice input via the APIM 50. The primary driver may enable/disable this feature for the secondary driver via the switches 26 or voice command 27 on the device 22. In particular, the secondary driver may not be able to disable the seatbelt minder feature, the reverse park feature, the object detection feature, the traction control feature, and the hands-free operation. It is contemplated that any number of operations may be controlled based on driver status and that those listed herein are simply noted for illustrative purposes.

The PCM 42 transmits a signal TRANS_STATUS which indicates the transmission status of the vehicle. For example, the signal TRANS_STATUS may indicate whether the transmission is in park, drive, reverse, neutral, or lock (e.g., the vehicle is locked in a first gear). The PCM 42 also transmits a signal VEH_SPEED which indicates that speed at which the vehicle is being driven. The PCM 42 transmits the signals TRANS_STATUS and VEH_SPEED over the communication bus to the device 22. The device 22 in turn transmits the signals TRANS_STATUS and VEH_SPEED to the APIM 50 over the communication bus. The relevance the APIM 50 receiving the signals TRANS_STATUS and VEH_SPEED will be discussed in more detail below.

A lane departure warning (LDW) module 44 is operably coupled to the device 22. The LDW module 44 may include a forward pointing camera (not shown) to determine what side of the vehicle is deviating from a lane or crossing over the lane to issue a warning. The LDW module 44 transmits a signal LDW_EVENTS to the device 22 so that the device generates an audible and/or visual warning for the driver.

The LDW module 44 is also configured to detect a shift in the driver's performance that may cause the vehicle to leave a lane or head off of the road. For example, the LDW module 44 measures a Driver's Impairment Monitor (DIMON) and assigns a rating to it. The DIMON tracks vehicle variation within the lane. In general, the LDW module 44 monitors the DIMON to detect a shift in the driver's performance that may be attributed to the driver exhibiting a drowsy or sleepy condition or a distraction that may be attributed to, among other things, cell phone operation while driving. In the event the DIMON rating is below a predetermined threshold, the LDW module 44 may transmit the DIMON rating on a signal DIMON to the device 22. The device 22 compares the rating on the signal DIMON to a predetermined value. If the DIMON rating is less than the predetermined value, then the device 22 may visually and/or audibly notify the driver that his/her performance has degraded. The visual or audible notice is generated at a point in time to allow the user to regain control of the vehicle at an early stage so that the driver can avoid inadvertently veering off the road or other failure mode. For example, the LDW module 44 may transmit a value between 1 and 6 on the signal DIMON that corresponds to the DIMON rating. In the event the value indicated on the signal DIMON is 3 or less, such a value may be indicative of a poor driving performance (or that the vehicle is exhibiting a wide variation between lines of a lane). If the device 22 determines that the value on the signal DIMON is less than 3, then the device 22 may trigger the warning for the driver.

The device 22 may record the number of LDW events and/or DIMON events that were generated for the secondary driver. The device 22 may transmit a signal REPORT that is indicative of the recorded number of LDW and/or DIMON events for the secondary driver to the APIM 50. In general, the device 22 may record a number of events, including but not limited, to the recorded number of LDW and/or DIMON events such as those events as set forth in co-pending International Application No: PCT/US09/48612, entitled "SYSTEM AND METHOD FOR RECORDING VEHICLE EVENTS AND FOR GENERATING REPORTS CORRESPONDING TO THE RECORDED VEHICLE EVENTS BASED ON DRIVER STATUS" filed on Jun. 25, 2009, which is hereby incorporated in reference in its entirety.

An ESC module 45 is operably coupled to the device 22. The ESC module 45 is adapted to control the operation of various electronic stability control (ESC) systems, such as traction control (TC), yaw stability control (YSC) and rollover stability control (RSC). The ESC module 45 may include a TC controller (not shown), a YSC controller (not shown) and a RSC controller (not shown). In general, the ESC module 45 transmits a signal ESC_EVENT that corresponds to a single event in which the ESC module has had to, among other things, adjust the yaw angle of the vehicle, correct the speed of the vehicle and/or apply the brakes of the vehicle to correct the movement of the vehicle. Generally, these factors may indicate the loss of vehicle control that may have occurred while the vehicle is being driven. Such potential collision events may reflect on the driving performance of a particular driver. The ESC module 45 transmits the signal ESC_EVENT to the device 22.

A restraint control module (RCM) 46 is operably coupled to the device 22. The RCM 46 may deploy various safety restraint systems in response to the vehicle experiencing an impact with an object. For example, the RCM 46 may deploy one or more airbags positioned about the vehicle, motorized pretensioners, and/or seat controls to reduce the risk of injury to vehicle occupants in the event the vehicle experiences an impact. The RCM 46 may be operably coupled to sensors in the vehicle that enable the RCM 46 to measure roll, yaw, and pitch rates associated with the vehicle. The RCM 46 may use the roll, yaw, and pitch to detect various "near miss" events such near miss events may also be defined as potential collision events. Near miss events generally include a sudden loss in speed and acceleration data (such as the roll, yaw, and pitch) or other high energy events. Such near miss events may not include the occurrence of an actual collision (e.g., actual deployment of airbag). The RCM 46 is configured to detect near miss events and transmit data indicating the presence of such over a signal NEAR_MISS to the device 22. In general, the RCM 46 is configured to provide similar information to that of the ESC module 45 and is provided in the event the vehicle is not equipped with the advanced active safety systems of the ESC module 45.

An adaptive cruise control (ACC) module 47 is operably coupled to the device 22. The ACC module 47 is generally configured to detect when the vehicle may be on a path that leads to a forward collision (FC). The ACC module 47 is operably coupled to radars (not shown) to detect the presence/proximity of a vehicle that may engage in a forward collision with the vehicle. The device 22 generally issues warnings (audible and/or visual) to the driver in the event the vehicle is detected to be on course or on a path that may lead to a forward collision so that the driver can take corrective action. In the event the ACC module 47 detects that the vehicle is on a path that may lead to a forward collision, the ACC module 47 transmits a signal FCW_EVENT to the device 22 so that the device 22 triggers an alert.

The ACC module 47 may also detect whether the vehicle is in a "tailgating mode" with respect to a vehicle positioned ahead of the current vehicle. The ACC module 47 uses the radars to determine whether the vehicle is in the tailgating mode. It is known in the art to use radars to detect the proximity of the vehicle. Such features will not be described further. The device 22 issues a warning (audible and/or visual) to the driver in the event the vehicle is detected to be tailgating another vehicle. The alert notifies the driver that the vehicle may be too close to the forward vehicle. In the event the vehicle is detected to be in the tailgating mode with respect to a forwardly positioned vehicle, the ACC module 47 transmits a signal TAILGATE to the device 22 so that the device 22 triggers an alert. The FCW and tailgate warning may be issued once the vehicle is detected to be traveling above a predetermined vehicle speed. For example, the ACC module 47 may monitor for FCW and tailgate events if the vehicle speed is above 25 mph or other suitable vehicle speed. The particular speed threshold for monitoring FCW and tailgate events may vary.

A blind spot monitoring (BSM) module 48 is operably coupled to the device 22. The BSM module 48 is configured to determine whether a vehicle is in or entering into a detection zone to either side (e.g., left or right side) of the vehicle. The BSM module 48 provides an alert to the driver when a vehicle is overtaking the subject vehicle (i.e., the vehicle referenced to include the BSM module 48) or is stagnating within the detection zone. The BSM module 48 transmits a signal BSM to the device 22 so that the device 22 generates a warning (e.g., audible and/or visual) to the driver. The warning is intended to notify the driver that a vehicle is located in the detection zone of the target vehicle.

In general, the device 22 uses the signal LDW and the signal BSM to monitor for space management events. For example, the LDW module 44 is configured to trigger and event if the vehicle departs from either a left or right side of the lane and the BSM module 48 provides an alert to notify the driver that a vehicle is in the detection zone. The device 22 uses such alerts to monitor for space management events. The triggering of both a BSM event and a LDW event may be indicative of a poor driving performance.

The APIM (or communication module) 50 is operably coupled to the device 22. The APIM 50 is configured to receive the OCD 52. The APIM 50 is generally part of an in-vehicle communication system which interfaces with the OCD 52 to enable voice input control to perform a function with the OCD 52 so that the driver does not have to enter data via buttons located directly on the OCD 52. The APIM 50 may also interface with switches (not shown) positioned throughout the vehicle to enable touch selection control to perform a function with the OCD 52 so that the driver does not have to enter data directly via switches 56 on the OCD 52. The OCD 52 is wirelessly coupled to the APIM 50. The OCD 52 may also include a display 57. In one example, the APIM 50 may be implemented as part of the SYNC system developed by Ford Motor Company® and Microsoft®. The OCD 52 may include any number of communication devices that use a wireless protocol 54. For example, one such wireless protocol 54 may include Bluetooth™ or other suitable protocols. The OCD 52 may use any protocol that is generally situated to facilitate wireless communication. The APIM 50 may wirelessly transmit a number of vehicle related signals to the OCD 52. This will be explained in more detail below.

In general, the OCD 52 may be a phone, a text messaging device, a music generating device (such as a phone that plays MP3 songs) whereby all of such items use the Bluetooth™ protocol to communicate. In yet another example, the OCD 52 may include other devices such as Universal Serial Bus (USB) based music playback devices (e.g., Zune™ and iPod® by Apple®). In yet another example, the OCD 52 may include a link that is hardwired coupled into a line-in input provided on the APIM 50. Such a link may receive an input from music playback device to transmit audio via speakers in the vehicle.

The APIM 50 enables the driver to perform functions with the OCD 52 by receiving voice input commands or touch selection via the switch so that the driver does not have to enter various selections directly with the OCD 52 via the switches 56. It is generally preferable that drivers avoid entering data or making selections via the switches 56 positioned directly on the OCD 52. It is known that a driver may be distracted while driving when manually inputting data or selecting data via the switches 56 located directly on the OCD 52. Such distractions may be avoided if the driver controls the OCD 52 via the voice command capability or the switch selection features offered by the vehicle. The APIM 50 may recognize any number of voice inputs to control the OCDs 52 to perform a particular function (e.g., place phone call, dial a particular number, adjust volume, turn on/off OCD 52, or any other foreseeable operation generally performed by the particular OCD 52). In addition, an occupant may enter data (e.g., the actual phone number or actual text) as a voice input followed by a command to dial the number via voice input. The driver, via the switches, may also perform one or more of the operations noted directly above.

In general, the APIM 50 provides a mechanism for enabling the primary driver or the secondary driver to control the OCD 52 so that the driver is not required to perform selections via the switches/buttons 56 positioned directly on the OCD 52. In order for the driver to use voice command capability or the switch selection features offered by the APIM 50 and/or the switches on the vehicle, it is necessary for the driver to electronically couple (or pair/mate) his/her OCD 52 to the APIM 50 to enable the primary or secondary driver to control the OCD 52 via the voice control or switch selection on the vehicle. In general, if the OCD 52 is not paired to the APIM 50, then the APIM 50 may not be able to transmit vehicle information to the OCD via the wireless protocol 54. The driver may if desired, choose not to couple or pair his/her OCD to the APIM 50. The APIM 50 transmits a signal PAIR_STATUS to the device 22 which is indicative of whether the driver has paired his/her OCD 52 to the APIM 50.

The APIM 50 is configured to also monitor when a call occurred and the length of call performed by the secondary driver. The APIM 50 transmits a signal OCD_USAGE to the device 22. The signal OCD_USAGE corresponds to the time in which a call took place and the amount of time a particular driver used the OCD 52.

The device 22 may generate a report that details various recorded events and profiles for the secondary driver and transmit the same over a signal REPORT to the APIM 50. Such recorded events may include, but not limited to, vehicle speed, lane departures, OCD usage, and pair status. The APIM 50 may wirelessly transmit the report over an output link 53 via any OCD to be uploaded into a server (not shown) so that the primary driver can review the same over a computer. Methods that can be used to wirelessly transmit data from the vehicle with the link 53 may include, but not limited to, voice over data (such as but not limited to, services provided by Airbiquity®, data channels provided on OCD 52, or Wifi). Alternatively, a USB port 55 (or other suitable communication port) may be positioned in the vehicle so that the primary driver can download the report and profiles generated for the secondary driver as desired.

As also noted above, the device 22 may include a display so that the reports and corresponding usage profiles can be viewed therefrom. In addition, the device 22 can co-act with the APIM 50 to provide automated e-mails to the primary driver or the secondary driver that contain the event reports after a corresponding report is generated. The primary driver and/or the secondary driver can setup an automated e-mail generation via the device 22.

In addition to the device 22 transmitting the signal REPORT to the APIM 50, the device 22 may also transmit the signals DRIVER_STATUS_1, TRANS_STATUS, and VEH_SPEED to the APIM 50. The APIM 50 is configured to wirelessly transmit a number of signals that provide vehicle level information to the OCD 52 via the wireless protocol 54. The OCD 52 is generally capable of controlling the manner in which data is received based on the vehicle level information received from the APIM 50. For example, the APIM 50 may transmit the signals TRANS_STATUS and VEH_SPEED to the OCD 52. In turn, in the event the OCD 52 determines that the vehicle is traveling over a predetermined speed (e.g., 0 mph) and/or that the transmission status for the vehicle is in a non-park mode (e.g., vehicle in reverse, neutral, drive, or locked first gear), the OCD 52 may prevent the driver from manually inputting data via the switches 56 located directly on the OCD 52. In this example, the driver may input data into the OCD 52 through voice command (e.g., hands free operation) as enabled via the APIM 50 or switches positioned throughout the vehicle. The driver can verbally command the OCD 52 to dial a particular number/contact, hang up, etc. The driver can also engage in a conversation with the other party without having to hold the OCD 52 or place the OCD 52 close to the driver. In the hands free operation, the driver may communicate via a microphone (not shown) in the vehicle and listen to the other party. The dialog between the driver and the other party on the line is broadcast via speakers (not shown) in the vehicle. In the hands free operation, the APIM 50 transmits a signal VOICE_COMMAND over the wireless protocol 54 to the OCD 52 such that the OCD 52 performs a function as specified on the signal VOICE_COMMAND. In one example, the signal VOICE_COMMAND may be translated data that is generated by the APIM 50. In another example, the signal VOICE_COMMAND may be the actual voice command that is generated by the driver and transmitted to the OCD 52 so that the OCD 52 performs the data translation.

The OCD 52 may be arranged such that the hands free operation is automatically enabled in response to determining that the driver of the vehicle is the secondary driver. In this example, the APIM 50 wirelessly transmits the signal DRIVER_STATUS_2 to the OCD 52 over the wireless protocol 54 so that the OCD 52 determines whether the driver is the primary driver or the secondary driver. In response to determining that the signal DRIVER_STATUS_2 corresponds to the secondary driver, the OCD 52 may force the hands free operation on so that the secondary driver is not permitted to manually select switches 56 on the OCD 52. The OCD 52 may enable the primary driver to select the switches 56 thereon in order to use the OCD 52.

In one example, the OCD 52 may be arranged to force the hands free operation for any driver (e.g., irrespective of whether the driver is the primary or the secondary driver). In another example, the OCD 52 may be arranged to determine primary and secondary drivers and control the manner in which data is entered thereon based on driver status. The method used by the OCD 52 to force the hands free operation for drivers may vary to meet the desired criteria of a particular implementation.

The driver may have the option of selecting a privacy mode while the driver is performing the hands free operation so that other occupants in the vehicle are not able to hear a conversation between the driver and the other party. For example, while the driver is in the hands free mode, the conversation between the driver and the other party on another phone is broadcast over the speakers in the vehicle. In the event the driver does not want other occupants in the vehicle to hear a portion of the conversation, the driver may select via a switch positioned on the APIM 50 or elsewhere in the vehicle to enable the privacy mode. The privacy mode removes the conversation from being broadcast to the occupants in the vehicle. In the privacy mode, the driver may pick up and use the OCD 52 in its normal operating mode. If the driver selects the privacy mode operation, the APIM 52 may transmit a signal PRIVACY_MODE to the OCD 52 so that the OCD 52 removes the hands free option for the driver and enables the normal use of the OCD 52.

The APIM 50 receives a signal DRIVER_PERF to monitor the driving behavior of the driver. The signal DRIVER_PERF generally includes all information included from the signals ESC_EVENTS, NEAR_MISS, FCW_EVENTS, TAILGATE, DIMON, LDW_EVENTS, and BSM_EVENTS. For example, in the event the driver is engaged in a private conversation over the OCD 52 and the signal DRIVER_PERF indicates that the driver's performance has degraded based on one or more of detected FCW events, near miss events, ESC events, tailgate events, BSM events, LDW events or DIMON ratings, the APIM 50 may terminate the privacy mode and the OCD 52 resumes the hands free operation. In the event the APIM 50 determines that the driver's performance has degraded based on the factors provided above and the APIM 50 determines that the driver is using the OCD 52, the APIM 50 may transmit a signal WARNING to the device 22. The device 22 may audibly or visually issue a warning to the driver. The OCD 52 may transmit a signal OCD_IN_USE to the APIM 50 so that the APIM 50 has knowledge that the occupant is using the OCD 52. In one example, the APIM 50 may determine that the driver is using the OCD 52 if the driver selects the switch to enter into the privacy mode.

Figure 2:
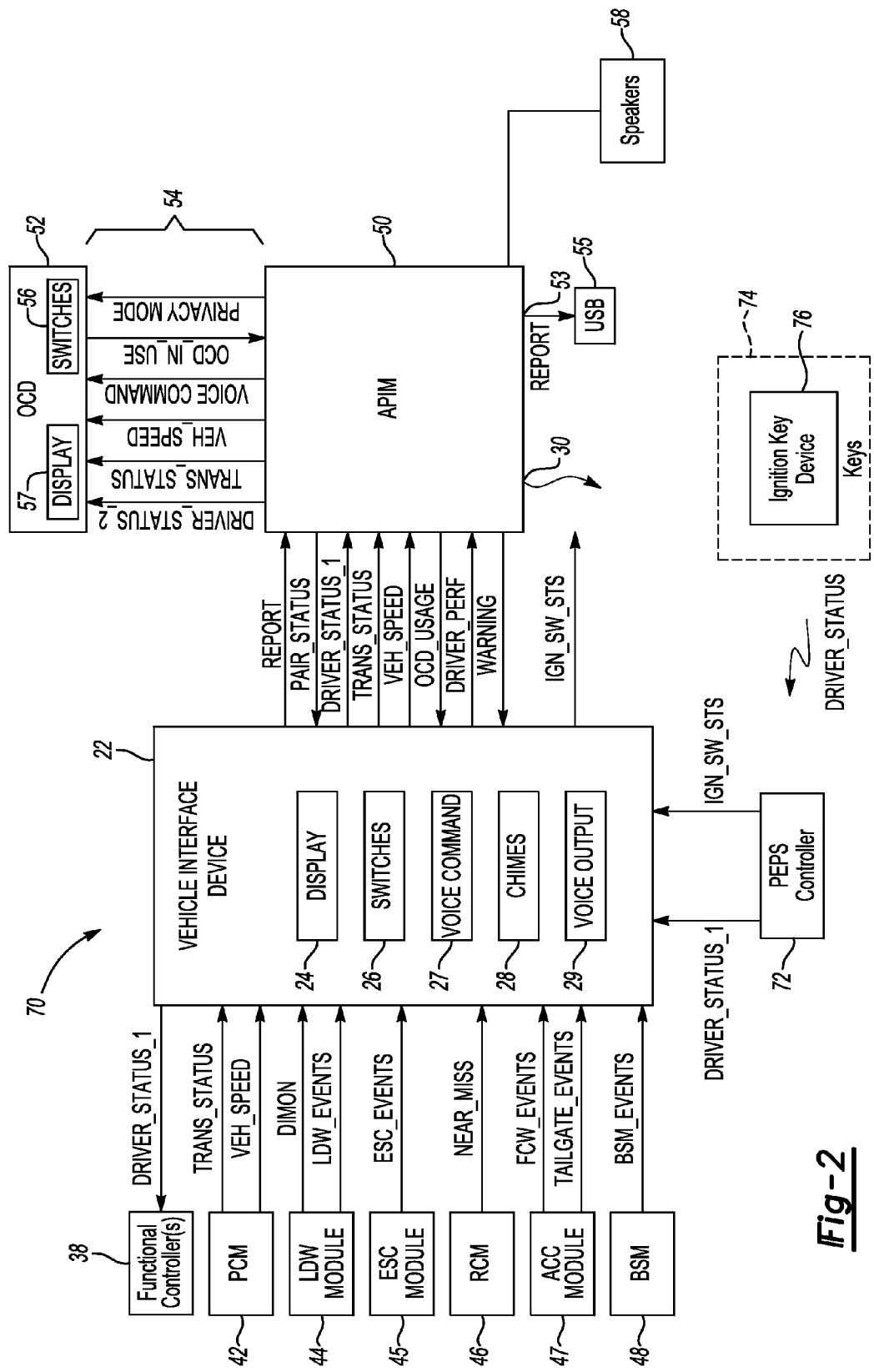
FIG. 2 depicts a system for transmitting vehicle information to the OCD in accordance to another embodiment of the present invention.

FIG. 2 depicts a system 70 for transmitting vehicle information to the OCD 52 in accordance to another embodiment of the present invention. The system 70 is generally similar to the system 20 but includes, among other things, a passive entry passive start (PEPS) controller 72 instead of the PATS controller 30. While FIG. 2 generally illustrates that the PEPS controller 72 is positioned external to the vehicle interface device 22, other implementations may include positioning circuitry and software used to perform the operations of the PEPS controller 72 within the vehicle interface device 22 or within any other controller or module in the vehicle.

In general, the PEPS function is a keyless access and start system. The driver may own two or more keys 74 that may be in the form of an electronic transmission device (e.g., a key fob). With the PEPS implementation, the user is not required to use a mechanical key blade to open the door of the vehicle or start an engine of the vehicle. The key 74 may include a mechanical key to ensure that the driver can access and start the vehicle in the event the key 74 exhibits low battery power. The keys 74 each include an ignition key device 76 embedded within for communicating with the PEP controller 72. The ignition key device 76 may be in the form of a transponder that includes an integrated circuit and an antenna. The transponder of the ignition key device 76 is configured to transmit the signal DRIVER_STATUS as an RF signal to a receiver (not shown) in the PEPS controller 72. The signal DRIVER_STATUS may be indicative of which driver (e.g., primary or secondary) is driving the vehicle. To gain access or entry into the vehicle with the keys 74, the driver may need to wake up the PEPS controller 72 to establish bi-directional communication between the keys 74 and the PEP controller 72. In one example, the wake up may occur by requiring the driver to touch and/or pull the door handle of the vehicle. In response to the door handle being toggled or touched, the PEPS controller 72 may wake up and transmit RF based signals to the key 74.

The PEPS controller 72 and the key 74 may undergo a series of communications back and forth to each other (e.g., handshaking) for vehicle access authentication purposes. The PEPS controller 72 may unlock the doors in response to a successful completion of the handshaking process. Once the driver is in the vehicle, the driver may simply press a button positioned on an instrument panel and brake pedal to start the vehicle. The driver may only press the button to place the vehicle into an accessory mode.

In one example, the system 70 may be adapted to tag or associate the keys as either a primary or a secondary key during a learn operation as discussed with the PATS controller 30. In yet another example, the system 70 may be configured to associate the keys 74 as primary or secondary keys in the manner identified and disclosed in one or more of the following U.S. patent Ser. No. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; and Ser. No. 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009. The PEPS controller 82 may determine the driver status based on the information indicated on the signal DRIVER_STATUS as noted in connection with the system 20 of FIG. 1.

The PEPS controller 72 is adapted to provide the signal DRIVER_STATUS_1 to the various controllers over the communication bus. The signal DRIVER_STATUS_1 corresponds to whether the driver is the primary driver or the secondary driver. The PEPS controller 72 may also transmit the signal IGN_SW_STS to the device 22. The PEPS controller 72 determines that the key ignition status is in the run position in response to the driver toggling the brake pedal (not shown) and depressing the start switch. In this case, the vehicle is started and the PEPS controller 72 transmits the signal IGN_SW_STS as being in the run state. In the event the driver selects only the start button, the PEPS controller 72 transmits the signal IGN_SW_STS as being in the accessory state.

While FIGS. 1-2 generally disclose keys 35 and 74 that are used in connection with the PATS and PEPS implementations, respectively, it is generally contemplated that the keys may be implemented as a cell phone (e.g., the OCD 52) or other suitable switch device used to authenticate the driver to the vehicle for enabling entry into the vehicle or for starting the vehicle. Data transmitted from the cell phone may be received by a receiver (not shown) on the vehicle and decoded to perform driver authentication for gaining entry into the vehicle, starting the vehicle, and ascertaining driver status. In general, the APIM 50 as implemented in connection with FIG. 2 may operate in a similar manner to that disclosed in connection with FIG. 1.

Figure 3:
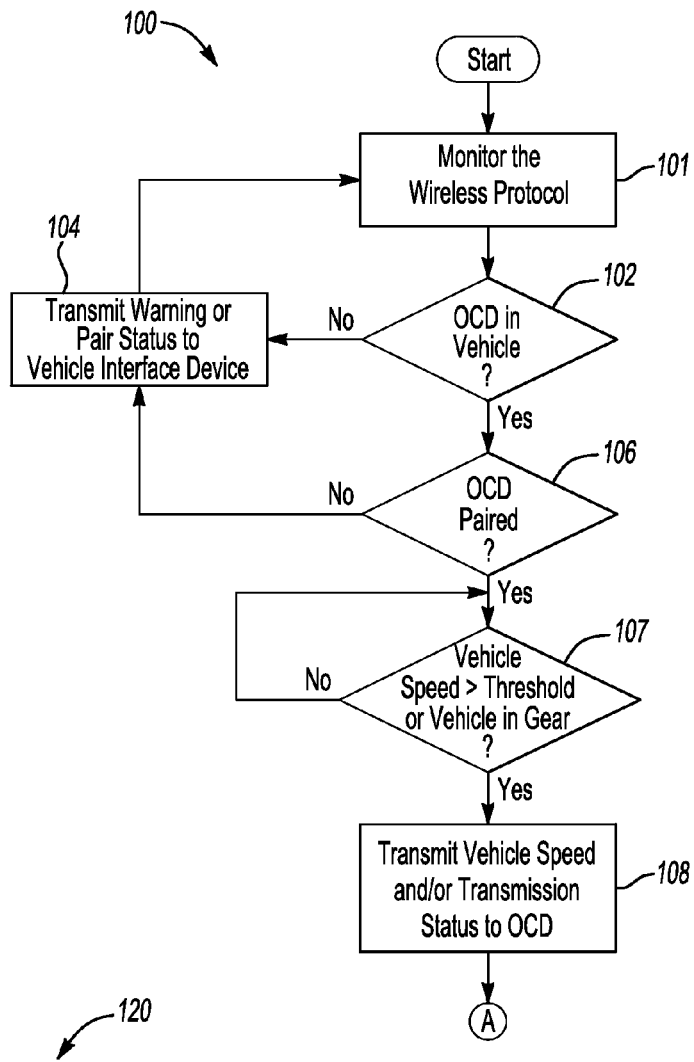
FIG. 3 depicts a method for transmitting vehicle information to the OCD in accordance to one embodiment of the present invention.

FIG. 3 depicts a method 100 for transmitting vehicle information to the OCD 52 in accordance to one embodiment of the present invention. It is recognized that the operations disclosed in connection with the method 100 may be executed in any suitable arrangement and that the operations are not intended to be executed solely in the manner shown.

In operation 101, the APIM 50 monitors the wireless protocol 54 to determine whether an OCD 52 is in the vehicle.

In operation 102, the APIM 50 determines whether an OCD 52 is in the vehicle. For example, the APIM 50 determines whether the OCD 52 is in the vehicle by monitoring whether a valid connection can be made with the OCD 52 via the wireless protocol 54. If an OCD 52 is not in the vehicle, the method 100 moves to operation 104. If the OCD 52 is in the vehicle, then the method 100 moves to operation 106.

In operation 104, the APIM 50 transmits the signal WARNING to the device 22. The device 22 may warn the driver of the dangers associated with manual operation of the OCD 52 while driving.

In operation 106, the APIM 50 determines whether the OCD 52 that is detected in the vehicle is paired to the APIM 50. For example, the driver may electronically configure his/her OCD 52 to recognize the APIM 50 as a trusted device. Various phone lists and/or other information stored in the OCD 52 can be stored as personal settings within the APIM 50 at the time the OCD 52 is paired to the APIM 50.

The APIM 50 is capable of transmitting the vehicle information to the OCD 52 if the OCD 52 is paired to the APIM 50.

If the APIM 50 determines that the OCD 52 is not paired thereto, then the method 100 moves back to operation 104. If the APIM 50 determines that the OCD 52 is paired thereto, then the method 100 moves to operation 107.

In operation 104, the APIM 50 transmits the signal PAIR_STATUS that indicates that the OCD 52 is not paired to the APIM 50. In response, the device 22 may transmit a visual or audible warning and request the driver to pair his/her OCD 52 to the APIM 50.

In operation 107, the APIM 50 determines whether the vehicle is moving by (i) comparing vehicle speed against a predetermined vehicle speed (e.g., 3 kph or other suitable value) and/or (ii) determining whether the vehicle is in gear (e.g., a non-park gear) that allows the vehicle to move such as the reverse, neutral, drive or lock in first gear. Monitoring vehicle speed may be useful for vehicles that are not equipped with an automatic transmission.

In the event the vehicle speed is below the predetermined vehicle speed or the vehicle is not in a gear that allows the vehicle to move, then the method 100 remains in operation 107. If the vehicle speed is above the predetermined vehicle speed or the vehicle is in a gear that enables the vehicle to move, then the method 100 moves to operation 108.

In operation 108, the APIM 50 transmits the signal VEH_SPEED and/or the signal TRANS_STATUS to the OCD 52. For example, after the APIM 50 determines that the vehicle speed has exceeded the predetermined vehicle speed, the APIM 50 may include a one-bit value on the signal VEH_SPEED and transmit to the OCD 52. Likewise, in the event the APIM 50 determines that the vehicle is in a gear that enables the vehicle to move, the APIM 50 may include a one-bit value on the signal TRANS_STATUS and transmit to the OCD 52.

Figure 4:
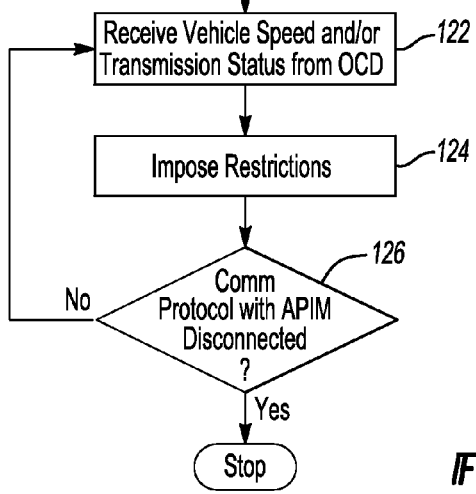
FIG. 4 depicts a method for receiving the vehicle information at the OCD in accordance to one embodiment of the present invention.

FIG. 4 depicts a method 120 for receiving vehicle information at the OCD 52 from the APIM 50 in accordance to one embodiment of the present invention. It is recognized that the operations disclosed in connection 120 may be executed in any suitable arrangement and that the operations are not intended to be executed solely in the manner shown.

In operation 122, the OCD 52 receives the signal VEH_SPEED and/or TRANS_STATUS from the APIM 50. The OCD 52 monitors the status of whether the vehicle is above the predetermined vehicle speed and/or whether the vehicle is in a non-park mode based on the data included on the signals VEH_SPEED and TRANS_STATUS.

In operation 124, the OCD 52 imposes restrictions on the usage of the OCD 52 in the event the signal VEH_SPEED indicates that vehicle speed is above the predetermined vehicle speed and/or the signal TRANS_STATUS indicates the vehicle is in a non-park mode. It is contemplated that the OCD 52 may also receive the actual vehicle speed and/or transmission status from the APIM 50 and make the determination as to whether the vehicle speed is above the predetermined vehicle speed and/or the transmission status is in the non-park mode as opposed to such operations being performed by the APIM 50. Restrictions on usage may include, but not limited to, force on hands free operation (e.g., prevent driver from manually pushing switches 56 on the OCD 52 (to prevent texting, e-mail use, internet access, or other activity on the OCD 52 that may distract the driver) and/or filtering phone calls (e.g., only outgoing calls to emergency personnel, parents (or other close family members), or prevent incoming calls except for those that belong to emergency personnel or parents, etc. In the event the hands free operation is imposed by the OCD 52, the OCD 52 may provide an optional display thereon to indicate that the OCD 52 is in a hands free operation. For example, the display 57 of the OCD 52 may include the text "USE HANDS FREE OPERATION WHILE DRIVING".

In operation 126, the OCD 52 determines whether the APIM 50 is still connected thereto by monitoring the wireless protocol 54. If the OCD 52 determines that the wireless protocol 54 is disconnected (or unable to facilitate communication with the APIM 50), then the method 120 stops. At this point, the method 100 may be resumed again. If the OCD 52 determines that the wireless protocol 54 is connected (or able to facilitate communication with the APIM 50), then the method 120 moves back to operation 122.

Figures 5, 6:
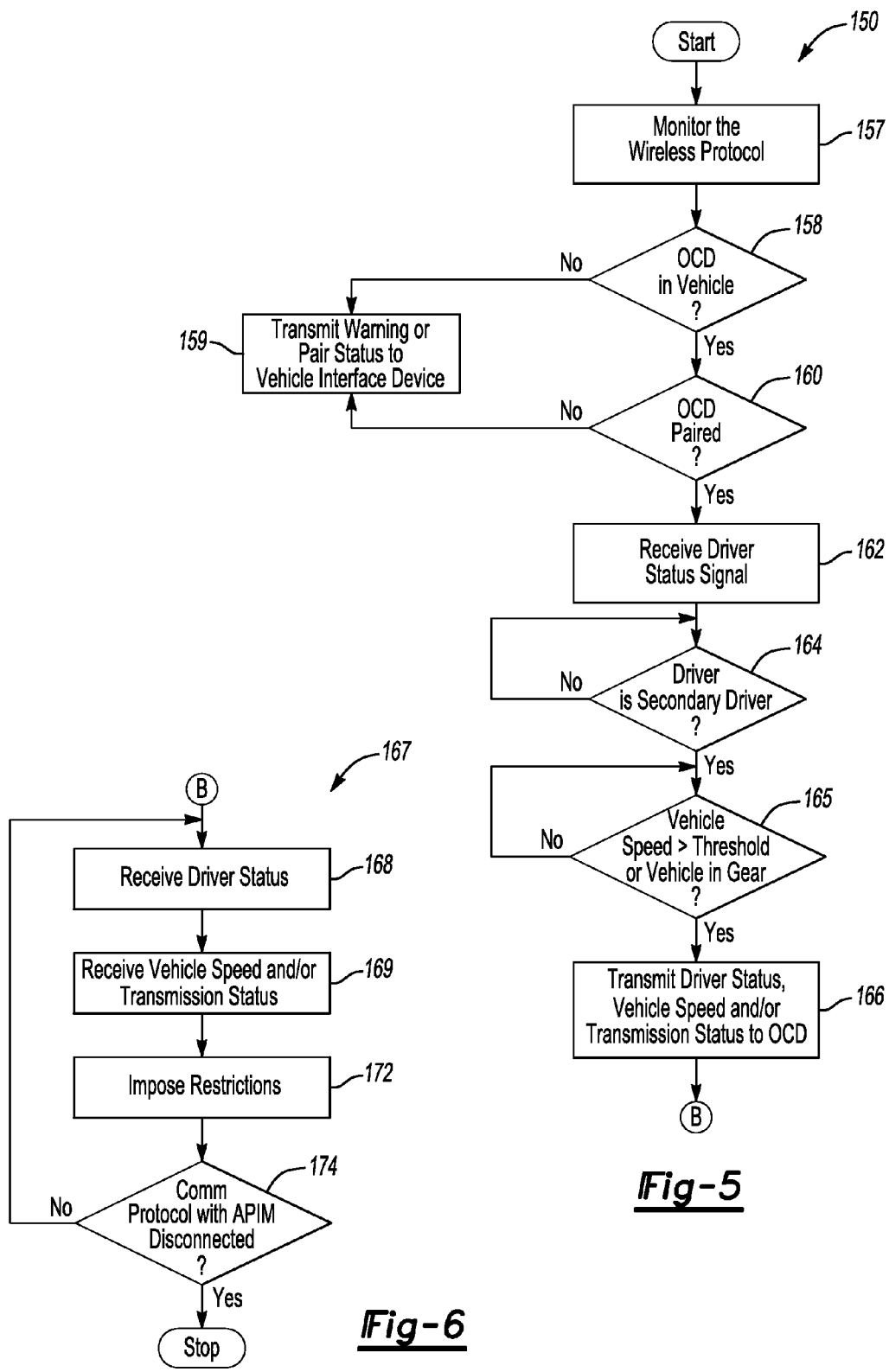
FIG. 5 depicts a method for transmitting vehicle information to the OCD in accordance to another embodiment of the present invention.
FIG. 6 depicts a method for receiving vehicle information at the OCD in accordance to another embodiment of the present invention.

FIG. 5 depicts a method 150 for transmitting vehicle information to the OCD 52 in accordance to another embodiment of the present invention. It is recognized that the operations disclosed in connection with the method 150 may be executed in any suitable arrangement and that the operations are not intended to be executed solely in the manner shown.

In operation 157, the APIM 50 monitors the wireless protocol 54 to determine whether an OCD 52 is in the vehicle.

In operation 158, the APIM 50 determines whether an OCD 52 is in the vehicle. For example, the APIM 50 determines whether a valid connection can be made with the OCD 52 via the wireless protocol 54. If the OCD 52 is not in the vehicle, the method 150 moves to operation 159. If the OCD 52 is in the vehicle, the method 150 moves to operation 160.

In operation 159, the APIM 50 transmits the signal WARNING to the device 22. The device 22 may warn the driver of the dangers associated with manual operation of the OCD 52 while driving.

In operation 160, the APIM 50 determines whether the OCD 52 is paired thereto. If the APIM 50 determines that the OCD 52 is not paired thereto, then the method 150 moves to operation 159. If the APIM 50 determines that the OCD 52 is paired thereto, then the method 100 moves to operation 162.

In operation 159, the APIM 50 transmits the signal PAIR_STATUS that indicates that the OCD 52 is not paired to the APIM 50. In response, the device 22 may transmit a visual or audible warning and request the driver to pair his/her OCD 52 to the APIM 50. The device 22 may also transmit a visual or audible warning to the driver regarding the dangers of manual operation of the OCD 52 while driving the vehicle.

In operation 162, the APIM 50 receives the signal DRIVER_STATUS_1 from the device 22. The APIM 50 transmits the signal DRIVER_STATUS_2 to the OCD 52 over the wireless protocol 54 so that the OCD 52 has knowledge as to the identity of the driver. For example, the OCD 52 may impose restrictions in the event the signal DRIVER_STATUS_2 indicates that the driver is a secondary driver. It is contemplated that the APIM 50 may continuously (or periodically) transmit driver identity in real time to the OCD 52.

In operation 164, the APIM 50 determines whether the driver is the primary driver or the secondary driver based on the information included on the signal DRIVER_STATUS_1. If the driver of the vehicle is the primary driver, then the method 150 remains in operation 164 and there are no restrictions imposed on the primary driver based on the vehicle information. If the driver of the vehicle is the secondary driver, then the method 150 moves to operation 165.

In operation 165, the APIM 50 determines whether the vehicle is moving by (i) comparing vehicle speed against a predetermined vehicle speed (e.g., 3 kph or other suitable value) and/or (ii) determining whether the vehicle is in gear (e.g., a non-park gear) that allows the vehicle to move such as the reverse, neutral, drive or lock in first gear. Monitoring vehicle speed may be useful for vehicles that are not equipped with an automatic transmission. It is contemplated that the APIM 50 transmits the vehicle speed and/or the transmission status continuously (or periodically), in real time, to the OCD 52.

In the event the vehicle speed is below the predetermined vehicle speed or the vehicle is not in a gear that allows the vehicle to move, then the method 150 remains in operation 165. If the vehicle speed is above the predetermined vehicle speed or the vehicle is in a gear that enables the vehicle to move, then the method 150 moves to operation 166.

In operation 166, the APIM 50 transmits the signal TRANS_STATUS and/or VEH_SPEED. For example, after the APIM 50 determines that the vehicle speed has exceeded the predetermined vehicle speed, the APIM 50 may include a one-bit value on the signal VEH_SPEED and send to the OCD 52. Likewise, in the event the APIM 50 determines that the vehicle is in a gear that enables the vehicle to move, the APIM 50 may include a one-bit value on the signal TRANS_SPEED and transmit to the OCD 52. The APIM 50 also transmits the signal DRIVER_STATUS_2 to the OCD 52 in the event the driver is detected to be the secondary driver.

FIG. 6 depicts a method 167 for receiving vehicle information at the OCD 52 from the APIM 50 in accordance to another embodiment of the present invention. It is recognized that the operations disclosed in connection with the method 167 may be executed in any suitable arrangement and that the operations are not intended to be executed solely in the manner shown.

In operation 168, the OCD 52 receives the signal DRIVER_STATUS_2 from the APIM 50 which indicates that the driver of the vehicle is the secondary driver. It is contemplated that the OCD 52 imposes restrictions only on the secondary driver so long as the vehicle speed and/or transmission status criteria is met.

In operation 169, the OCD 52 receives the signal VEH_SPEED and/or TRANS_STATUS from the APIM 50. The OCD 52 monitors the status of whether the vehicle is above the predetermined vehicle speed or whether the vehicle is in a non-park mode based on the data included on the signals VEH_SPEED and TRANS_STATUS.

In operation 172, the OCD 52 imposes restrictions on the usage of the OCD 52 in the event the driver is above the predetermined vehicle speed and/or the signal TRANS_SPEED indicates that the vehicle is in the non-park mode. It is contemplated that the OCD 52 may also receive the actual vehicle speed and/or transmission status from the APIM 50 and make the determination as to whether the vehicle speed is above the predetermined vehicle speed or whether the vehicle is in the non-park mode as opposed to such operations being performed by the APIM 50. Likewise, the APIM 50 may also make such a determination regarding driver identity (e.g., primary driver or secondary driver). Restrictions on usage may include, but not limited to, force on hands free operation (e.g., prevent driver from manually pushing switches 56 on the OCD 52 (to prevent texting, e-mail use internet access and/or other activity on the OCD 52 that may distract the driver), filtering phone calls (e.g., only outgoing calls to emergency personnel, parents (or other close family members), or prevent incoming calls except for those that belong to emergency personnel or parents, etc. In the event the hands free operation is imposed by the OCD 52, the display 57 of the OCD 52 may indicate that the OCD 52 is in a hands free operation. For example, the display 57 may depict "USE HANDS FREE OPERATION WHILE DRIVING".

In operation 174, the OCD 52 determines whether the APIM 50 is still connected thereto by monitoring the wireless protocol 54. If the OCD 52 determines that the wireless protocol 54 is disconnected (or unable to facilitate communication with the APIM 50), then the method 167 stops. At this point, the method 100 may be resumed again. If the OCD 52 determines that the wireless protocol 54 is connected (or able to facilitate communication with the APIM 50), then the method 167 moves back to operation 170.

Figure 7:
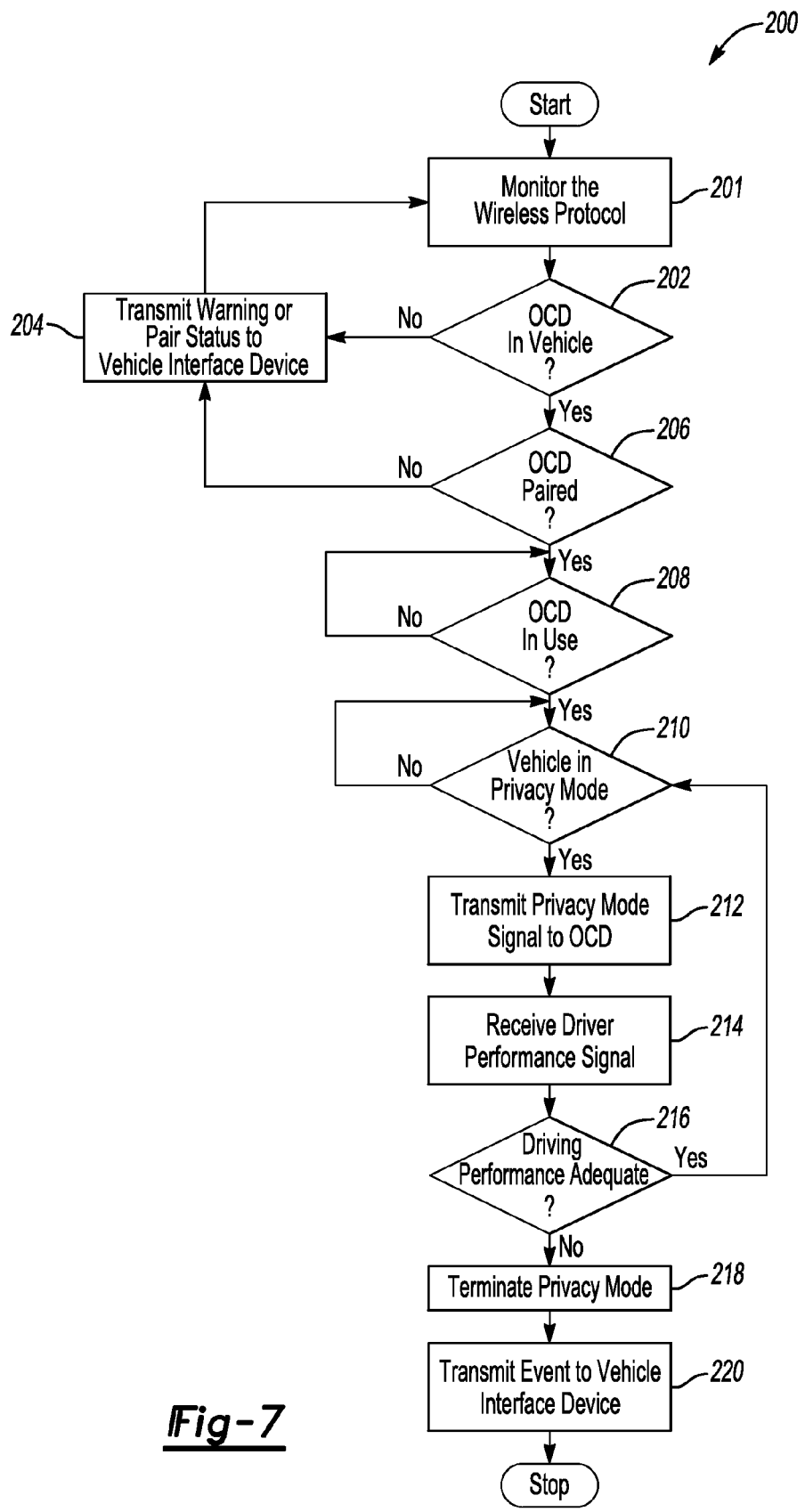
FIG. 7 depicts a method for transmitting vehicle information to the OCD in accordance to another embodiment of the present invention.

FIG. 7 depicts a method 200 for transmitting vehicle information to the OCD 52 in accordance to another embodiment of the present invention. It is recognized that the operations disclosed in connection with the method 200 may be executed in any suitable arrangement and that the operations are not intended to be executed solely in the manner shown. It is contemplated the method 200 may be used for an implementation in which driver identity is ascertained (e.g., primary or secondary driver).

In operation 201, the APIM 50 monitors the wireless protocol 54 to determine whether an OCD 52 is in the vehicle.

In operation 202, the APIM 50 determines whether an OCD 52 is in the vehicle. For example, the APIM 50 determines whether the OCD 52 is in the vehicle by monitoring whether a valid connection can be made with the OCD 52 via the wireless protocol 54. If an OCD 52 is not in the vehicle, the method 200 moves to operation 204. If the OCD 52 is in the vehicle, then the method 200 moves to operation 206.

In operation 204, the APIM 50 transmits the signal WARNING to the device 22. The device 22 may warn the driver of the dangers associated with manual operation of the OCD 52 while driving.

In operation 206, the APIM 50 determines whether the OCD 52 that is detected in the vehicle is paired to the APIM 50. For example, the driver may electronically configure his/her OCD 52 to the APIM 50 so that the APIM 50 recognizes that the OCD 52 as a trusted device. Various phone lists and/or other information stored in the OCD 52 can be stored as personal settings within the APIM 50 at the time the OCD 52 is paired to the APIM 50. The APIM 50 is capable of transmitting the vehicle information to the OCD 52 if the OCD 52 is paired to the APIM 50.

If the APIM 50 determines that the OCD 52 is not paired thereto, then the method 200 moves back to operation 204. If the APIM 50 determines that the OCD 52 is paired thereto, then the method 200 moves to operation 208.

In operation 204, the APIM 50 transmits the signal PAIR_STATUS that indicates that the OCD 52 is not paired to the APIM 50. In response, the device 22 may transmit a visual or audible warning and request the driver to pair his/her OCD 52 to the APIM 50.

In operation 208, the APIM 50 determines whether the OCD 52 is in use. For example, the APIM 50 may determine whether the APIM 50 is being used based on the data indicated on the signal OCD_IN_USE. If the APIM 50 determines that the OCD 52 is not in use, the method 200 remains in operation 208. If the APIM 50 determines that the OCD 52 is in use, then the method 200 moves to operation 210.

In operation 210, the APIM 50 determines whether the driver of the vehicle has selected the privacy mode option. As noted above, the driver may select a switch positioned on the APIM 50 or elsewhere in the vehicle to enter into the privacy mode. The privacy mode may return the conversation that is being held between the driver and the other participant into a private conversation. In this mode, the driver may speak directly into the microphone of the OCD 52 and privately hear the other participant's comments through the OCD 52 so that the remaining occupants in the vehicle cannot hear the conversation. This feature may be available for the primary driver and/or the secondary driver. In some embodiments, the privacy mode feature may be configurable by the primary driver. Meaning, the primary driver may selectively enable/disable this feature via the switches 26, voice command 27 or other suitable devices that cooperate with the device 22 for the secondary driver. If the primary driver disables the privacy mode feature, then the secondary driver is not capable of engaging in a private conversation with another participant to ensure that the secondary driver is not distracted while driving when attempting to manipulate the switches 56 of the OCD 52.

If the APIM 50 determines that the driver has not selected the privacy mode feature, then the method 200 remains in operation 210. If the APIM 50 determines that the driver has selected the privacy mode, then the method 200 moves to operation 212.

In operation 212, the APIM 50 transmits the signal PRIVACY_MODE to the OCD 52. In response, the OCD 52 operates in a normal operating mode, which allows the driver to speak into the microphone and the driver to hear the other participant from a speaker included therein (e.g., the driver is able to manually use the OCD 52).

In operation 214, the APIM 50 receives the signal DRIVER_PERF from the device 22.

In operation 216, the APIM 50 determines whether the driver's performance while in the privacy mode is adequate by monitoring the signal DRIVER_PERF that includes the signals DIMON, LDW_EVENTS, ESC_EVENTS, NEAR_MISS, FCW_EVENTS, TAILGATE, and/or BSM_EVENTS. If the APIM 50 determines that the driver's performance is adequate (e.g., acceptable DIMON ratings, and/or no LDW, ESC, NEAR MISS, TAILGATE, and/or BSM events), then the method 200 moves back to operation 210 to determine if the privacy mode is still engaged. If the APIM 50 determines that the driver's performance is not adequate (e.g., non-acceptable DIMON ratings and/or the existence of LDW, ESC, NEAR MISS, TAILGATE, and/or BSM events), then the method 200 moves to operation 218. Such a condition may indicate, among other things, that the driving performance is poor while the driver is using the OCD 52. The signal BSM_EVENTS is included on the signal DRIVER_PERF, however, it is recognized that a blind-spot monitoring event may not be caused by the driver but another vehicle. Nonetheless, it may be necessary to warn the driver and terminate the privacy mode.

In operation 218, the APIM 50 terminates the privacy mode. For example, the APIM 50 may provide a command on the signal PRIVACY_MODE to terminate the privacy mode and transmit the same to the OCD 52. The OCD 52 may, in response to the signal PRIVACY_MODE, force on the hands free operation or terminate the call altogether.

In operation 220, the APIM 50 transmits the signal WARNING to the device 22, so that the device 22 visually or audibly warns the driver about the driving performance concern. The device 22 may also record the poor performance event and provide the same on the signal REPORT so that such data is capable of being viewed by the primary driver.

Figure 8:
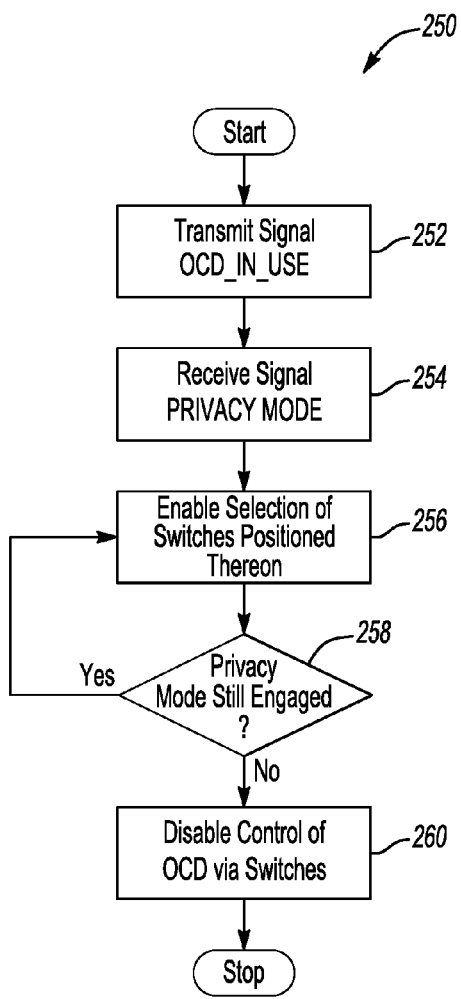
FIG. 8 depicts a method for transmitting and receiving information to and from the OCD in accordance to another embodiment of the present invention.

FIG. 8 depicts a method 250 depicts a method for transmitting and receiving information to and from the OCD 52 in accordance to another embodiment of the present invention. It is recognized that the operations disclosed in connection with the method 250 may be executed in any suitable arrangement and that the operations are not intended to be executed solely in the manner shown. It is contemplated that the operations of method 250 may be executed in combination with the operations of method 200.

In operation 252, the OCD 52 transmits the signal OCD_IN_USE to the APIM 50 over the wireless protocol 54. The signal OCD_IN_USE may be indicative of the driver being engaged in a conversation with another participant with the OCD 52.

In operation 254, the OCD 52 receives the signal PRIVACY_MODE over the wireless protocol 54 from the APIM 50. The signal PRIVACY_MODE may be indicative of a command from the driver to notify the OCD 52 that the driver desires a private conversation with the other participant.

In operation 256, the OCD 52 enables the driver to select switches 56 thereon to control the OCD 52 in the manner desired by the driver. In this case, the OCD 52 is not in a hands-free mode and the driver resumes normal operation over the OCD 52.

In operation 258, the OCD 52 determines whether the driver intends to remain in the privacy mode. For example, the OCD 52 monitors the signal PRIVACY_MODE to determine if the privacy mode feature is to be deactivated. In this case, the privacy mode feature may be deactivated by the driver or is to be deactivated in response to the driver exhibiting a poor driving condition as detected by LDW module 44.

If the OCD 52 determines that the privacy mode is to remain active, then the method 250 moves to operation 256. If the OCD 52 determines that the privacy mode is to be deactivated, then the method 250 moves to operation 260.

In operation 260, the OCD 52 disables control of the switches 56. In another example, the OCD 52 may terminate the call altogether in the event the driver is exhibiting a poor driving performance. For example, the APIM 50 may transmit a control signal to the OCD 52 to command the OCD 52 to simply terminate the call.

Figure 9:
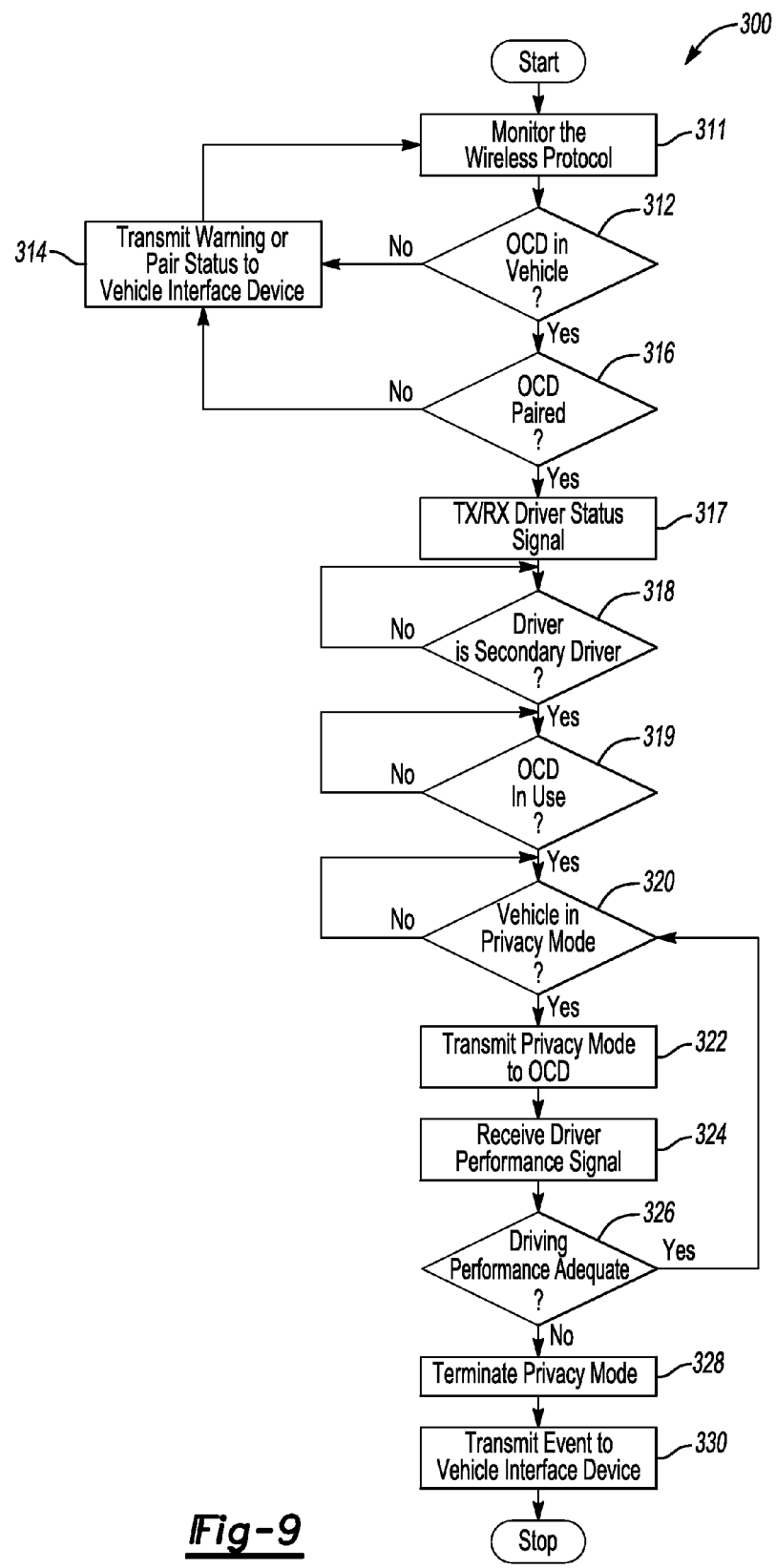
FIG. 9 depicts a method for transmitting vehicle information to the OCD in accordance to another embodiment of the present invention.

FIG. 9 depicts a method 300 for transmitting vehicle information to the OCD 52 in accordance to another embodiment of the present invention. It is recognized that the operations disclosed in connection with the method 300 may be executed in any suitable arrangement and that the operations are not intended to be executed solely in the manner shown.

In operation 311, the APIM 50 monitors the wireless protocol 54 to determine whether an OCD 52 is in the vehicle.

In operation 312, the APIM 50 determines whether an OCD 52 is in the vehicle. For example, the APIM 50 determines whether a valid connection can be made with the OCD 52 via the wireless protocol 54. If the OCD 52 is not in the vehicle, the method 300 moves to operation 314. If the OCD 52 is in the vehicle, the method 300 moves to operation 316.

In operation 314, the APIM 50 transmits the signal WARNING to the device 22. The device 22 may warn the driver of the dangers associated with manual operation of the OCD 52 while driving.

In operation 316, the APIM 50 determines whether the OCD 52 is paired thereto. If the APIM 50 determines that the OCD 52 is not paired thereto, then the method 300 moves to operation 314. If the APIM 50 determines that the OCD 52 is paired thereto, then the method 300 moves to operation 317.

In operation 314, the APIM 50 transmits the signal PAIR_STATUS that indicates that the OCD 52 is not paired to the APIM 50. In response, the device 22 may transmit a visual or audible warning and request the driver to pair his/her OCD 52 to the APIM 50. The device 22 may also transmit a visual or audible warning to the driver regarding the dangers of manual operation of the OCD 52 while driving the vehicle.

In operation 317, the APIM 50 receives the signal DRIVER_STATUS_1 from the device 22. The APIM 50 determines whether the driver is the secondary driver based on the information included on the signal DRIVER_STATUS_1. For example, the OCD 52 may impose restrictions in the event the driver is the secondary driver.

In operation 319, the APIM 50 determines whether the driver is the primary driver or the secondary driver based on the information included on the signal DRIVER_STATUS_1. If the driver of the vehicle is the primary driver, then the method 300 remains in operation 319. In this case, it is recognized that the method 300 will not attempt to terminate the privacy mode for the primary driver based on the vehicle information. If the driver of the vehicle is the secondary driver, then the APIM 50 transmits the signal DRIVER_STATUS_2 over the protocol 54 to the OCD 52 and the method 300 moves to operation 319.

In operation 318, the APIM 50 determines whether the OCD 52 is in use. For example, the APIM 50 may determine whether the APIM 50 is being used based on the data indicated on the signal OCD_IN_USE. If the APIM 50 determines that the OCD 52 is not in use, the method 300 remains in operation 318. If the APIM 50 determines that the OCD 52 is in use, then the method 300 moves to operation 320.

In operation 320, the APIM 50 determines whether the driver of the vehicle has selected the privacy mode option. As noted above, the driver may select a switch positioned on the APIM 50 or elsewhere in the vehicle to enter into the privacy mode. The privacy mode may return the conversation that is being held between the driver and the other participant into a private conversation. In this mode, the driver may speak directly into the microphone of the OCD 52 and privately hear the other participant's comments through the OCD 52 so that the remaining occupants in the vehicle cannot hear the conversation. The primary driver may selectively enable/disable this feature via the switches 26, voice command 27 or other suitable devices that cooperate with the device 22 for the secondary driver. If the primary driver disables the privacy mode feature, then the secondary driver is not capable of engaging in a private conversation with another participant to ensure that the secondary driver is not distracted while driving when attempting to manipulate the switches 56 of the OCD 52.

If the APIM 50 determines that the driver has not selected the privacy mode feature, then the method 300 remains in operation 320. If the APIM 50 determines that the driver has selected the privacy mode, then the method 300 moves to operation 322.

In operation 322, the APIM 50 transmits the signal PRIVACY_MODE to the OCD 52. In response, the OCD 52 operates in a normal operating mode, which allows the driver to speak into the microphone and the driver to hear the other participant from a speaker included therein (e.g., the driver is able to manually use the OCD 52).

In operation 324, the APIM 50 receives the signal DRIVER_PERF from the device 22 to monitor driver performance.

In operation 326, the APIM 50 determines whether the driver's performance while in the privacy mode is adequate by monitoring the signal DRIVER_PERF that includes the signals DIMON, LDW_EVENTS, ESC_EVENTS, NEAR_MISS, FCW_EVENTS, TAILGATE, and/or BSM_EVENTS. If the APIM 50 determines that the driver's performance is adequate (e.g., acceptable DIMON ratings, and/or no LDW, ESC, NEAR MISS, TAILGATE, and/or BSM events), then the method 300 moves back to operation 320 to determine if the privacy mode is still engaged. If the APIM 50 determines that the driver's performance is not adequate (e.g., non-acceptable DIMON ratings and/or the existence of LDW, ESC, NEAR MISS, TAILGATE, and/or BSM events), then the method 300 moves to operation 328. Such a condition may indicate, among other things, that the driving performance is poor while the driver is using the OCD 52. The signal BSM_EVENTS is included on the signal DRIVER_PERF, however, it is recognized that a blind spot monitoring event may not by the driver of the vehicle. Nonetheless, it may be necessary to warn the driver and terminate the privacy mode.

In operation 328, the APIM 50 terminates the privacy mode. For example, the APIM 50 may provide a command on the signal PRIVACY_MODE to terminate the privacy mode and transmit the same to the OCD 52. The OCD 52 may, in response to the signal PRIVACY_MODE, force on the hands free operation or terminate the call altogether.

In operation 330, the APIM 50 transmits the signal WARNING to the device 22, so that the device 22 visually or audibly warns the driver about the driving performance concern. The device 22 may also record the poor performance event and provide the same on the signal REPORT so that such data is capable of being viewed by the primary driver.

Figure 10:
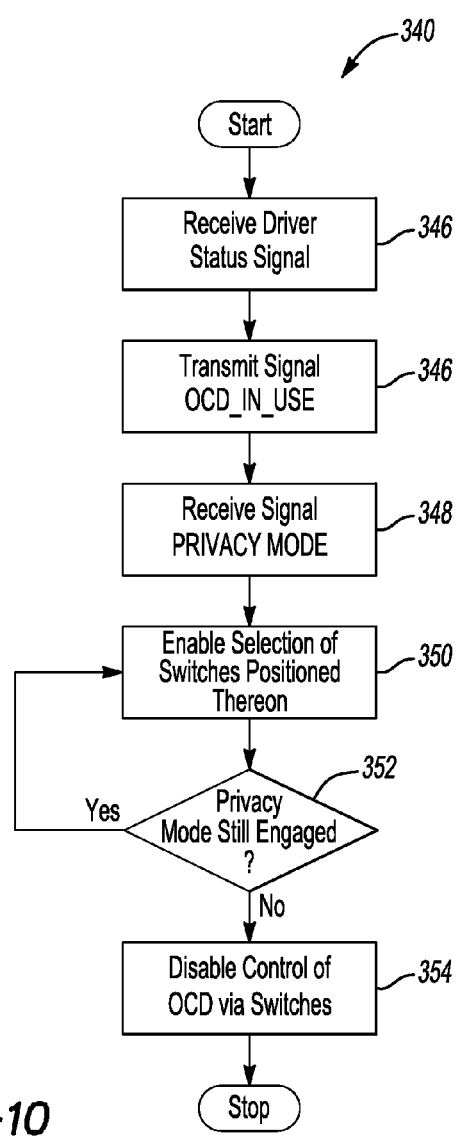
FIG. 10 depicts a method for receiving vehicle information at the OCD in accordance to another embodiment of the present invention.

FIG. 10 depicts a method 340 for transmitting and receiving information to and from the OCD 52 in accordance to another embodiment of the present invention. It is recognized that the operations disclosed in connection to the method 340 may be executed in any suitable arrangement and that the operations are not intended to be executed solely in the manner shown. It is contemplated that the operations of method 340 may be executed in combination with the operations of method 300.

In operation 342, the OCD 52 receives the signal DRIVER_STATUS_2 from the APIM 50 to determine driver identity. If the driver of the vehicle is the primary driver, then no restrictions are imposed. If the driver of the vehicle is the secondary driver, then the method 340 moves to operation 346.

In operation 346, the OCD 52 transmits the signal OCD_IN_USE to the APIM 50 over the wireless protocol 54. The signal OCD_IN_USE may be indicative of the driver being engaged in a conversation with another participant with the OCD 52.

In operation 348, the OCD 52 receives the signal PRIVACY_MODE over the wireless protocol 54 from the APIM 50. The signal PRIVACY_MODE may be indicative of a command from the driver to notify the OCD 52 that the driver desires a private conversation with the other participant.

In operation 350, the OCD 52 enables the driver to select switches 56 thereon to control the OCD 52 in the manner desired by the driver. In this case, the OCD 52 is not in a hands-free mode and the driver resumes normal operation over the OCD 52.

In operation 352, the OCD 52 determines whether the driver intends to remain in the privacy mode. For example, the OCD 52 monitors the signal PRIVACY_MODE to determine if the privacy mode feature is to be deactivated. In this case, the privacy mode feature may be deactivated by the driver or is to be deactivated based on the data indicated on the signal DRIVER_PERF.

If the OCD 52 determines that the privacy mode is to remain active, then the method 340 moves to operation 350. If the OCD 52 determines that the privacy mode is to be deactivated, then the method 340 moves to operation 354.

In operation 354, the OCD 52 disables control of the switches 56. In another example, the OCD 52 may terminate the call altogether in the event the driver is exhibiting a poor driving performance. For example, the APIM 50 may transmit a control signal to the OCD 52 to command the OCD 52 to simply terminate the call.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An apparatus for transmitting information from a vehicle to a portable occupant communication device (OCD); the apparatus comprising:
   a communication module positioned within the vehicle and being configured to:
      receive a driver status signal indicative of a driver for the vehicle being one of a primary driver and a secondary driver, the vehicle being configured to enable the primary driver to have greater control over vehicle functionality than the secondary driver;
      receive a transmission status signal indicative of a transmission mode for the vehicle; and
      transmit the driver status signal and the transmission status signal over a wireless protocol to the portable OCD such that the portable OCD is disabled from being controlled by switches positioned thereon if the driver status signal indicates that the driver is the secondary driver and the transmission mode enables movement of the vehicle.

2. The apparatus of claim 1 wherein the portable OCD fails to impose restrictions thereof in the event the driver status signal indicates that the driver is the primary driver.

3. The apparatus of claim 1 wherein the communication module is further configured to monitor the wireless protocol to detect the presence of the portable OCD prior to transmitting the transmission status signal and the driver status signal.

4. The apparatus of claim 1 wherein the communication module is further configured to determine whether the portable OCD has been electronically mated thereto prior to transmitting the transmission status signal and the driver status signal.

5. The apparatus of claim 4 wherein the communication module is further configured to transmit a signal to command the driver to electronically mate the portable OCD to the communication module in the event the portable OCD has not been electronically mated thereto such that the communication module is capable of transmitting the transmission status signal and the driver status signal to the portable OCD over the wireless protocol.

6. A method for transmitting information from a vehicle to a portable occupant communication device (OCD); the method comprising:
receiving a driver status signal indicative of a driver for the vehicle being one of a primary driver and a secondary driver, the vehicle designating the primary driver to possess greater control over vehicle functionality than the secondary driver;
receiving a transmission status signal indicative of a transmission mode for the vehicle; and
transmitting the driver status signal and the transmission status signal over a wireless protocol to the portable OCD such that the operation of the portable OCD is restricted if the driver status signal indicates that the driver is the secondary driver and the transmission mode enables movement of the vehicle.

7. The method of claim 6 further comprising monitoring the wireless protocol at the vehicle to detect the presence of the portable OCD prior to transmitting the transmission status signal and the driver status signal.

8. The method of claim 6 further comprising determining whether the portable OCD has been electronically mated thereto prior to transmitting the transmission status signal and the driver status signal.

9. The method of claim 8 further comprising transmitting a signal to command the driver to electronically mate the portable OCD to the vehicle in the event the portable OCD has not been electronically mated thereto to enable transmitting the transmission status signal and the driver status signal to the portable OCD over the wireless protocol.

10. The method of claim 6 further comprising transmitting, to the OCD, a signal indicative of a voice command that is provided by the driver to control an operation of the OCD.

11. An apparatus for transmitting vehicle information from a vehicle to a portable occupant communication device (OCD); the apparatus comprising:
a communication module positioned within the vehicle and being configured to:
receive a driver status signal indicative of a driver for the vehicle being one of a primary driver and a secondary driver,
receive a transmission status signal indicative of a transmission mode for the vehicle; and
transmit the driver status signal and the transmission status signal over a wireless protocol to the portable OCD such that an operation of the portable OCD is (i) restricted in the event the driver status signal indicates that the driver is the secondary driver and the transmission mode indicates movement of the vehicle and (ii) fully operational in the event the driver status signal indicates that the driver is the primary driver.

12. The apparatus of claim 11 wherein the vehicle is configured to enable the primary driver to possess greater control over vehicle functionality than that of the secondary driver.

13. The apparatus of claim 11 wherein the communication module is further configured to monitor the wireless protocol to detect the presence of the portable OCD prior to transmitting the transmission status signal and the driver status signal.

14. The apparatus of claim 11 wherein the communication module is further configured to determine whether the portable OCD has been electronically mated thereto prior to transmitting the transmission status signal and the driver status signal.

15. The apparatus of claim 14 wherein the communication module is further configured to transmit a signal to command the driver to electronically mate the portable OCD to the communication module in the event the portable OCD has not been electronically mated such that the communication module is capable of transmitting the transmission status signal and the driver status signal to the portable OCD over the wireless protocol.

* * * * *